United States Patent [19]

Dix

[11] Patent Number: 5,091,146
[45] Date of Patent: Feb. 25, 1992

[54] STEAM VENT TUBE FOR BWR FUEL ASSEMBLY

[75] Inventor: Gary E. Dix, Saratoga, Calif.

[73] Assignee: General Electric Company, San Jose, Calif.

[21] Appl. No.: 672,297

[22] Filed: Mar. 20, 1991

[51] Int. Cl.$^5$ .............................................. G21C 3/30
[52] U.S. Cl. .................................. 376/443; 376/371; 376/377
[58] Field of Search .............. 376/434, 433, 439, 443, 376/371, 377, 428, 444, 431

[56] References Cited

U.S. PATENT DOCUMENTS 5,017,332 5/1991 Dix et al. ............................ 376/444

Primary Examiner—Brooks H. Hunt
Assistant Examiner—Frederick H. Voss
Attorney, Agent, or Firm—Robert R. Schroeder

[57] ABSTRACT

In a fuel bundle for a boiling water reactor having one or more part length rods in the two phase region, a steam vent tube is introduced overlying the part length rods. The fuel bundle includes a lower tie plate for admitting water moderator and supporting a plurality of fuel rods in upstanding side-by-side relation, an upper tie plate for permitting water and steam to be discharged from the top of the fuel bundle and maintaining the fuel rods in upstanding side-by-side relation, a surrounding fuel channel for confining moderator flow along a path over the fuel rods and between the tie plates, and dispersed vertically intermittent spacers for maintaining the fuel rods in their designed side by side relation. One or more fuel rods extends from the lower tie plate vertically less than the full length to the upper tie plate ending interior of the fuel bundle at a disposition where the upper end of the part length rods is braced in the vertical position by a spacer. At least one of these partial length rods is provided with an overlying steam vent tube. This steam vent tube has openings and devices distributed along its length to encourage steam flow interior of the tube and remove liquid flow from the interior of the tube. The steam flow within the vent tube eliminates the interface drag between the steam interior of the tube and the surrounding water steam mixture. The presence of the steam vent tube as a high velocity steam escape path enables remaining portions of the fuel bundle to contain a higher liquid moderator fraction with flatter axial voids and power distributions during the operating state of the fuel bundle. The presence of high velocity escaping steam combined with distributed apertures along the length of the steam vent tube promotes resistance to fluid oscillations within the fuel bundles. Variations of steam vent tubes are disclosed including steam vent tubes overlying multiple clustered part length rods. There results a fuel bundle design in which the entire upper cross section of the fuel bundle is devoted to steam generation and coolant outflow.

21 Claims, 7 Drawing Sheets

STEAM VENT TUBE FOR BWR FUEL ASSEMBLY

This invention relates to nuclear fuel bundles having part length rods. More particularly, part length rods are disclosed in combination with overlying steam vent tubes for permitting the high velocity localized discharge of steam from the fuel bundle. A system of apertures and devices is disclosed distributed along the steam vent tube to preferentially enable steam flow interior of the steam vent tube and preferentially exclude liquid moderator flow interior of the steam vent tube.

BACKGROUND OF THE INVENTION

Ueda Japanese Patent Showa 52-50489 disclosed the use of part length fuel rods for the creation of an improved fuel to moderator ratio in the upper two phase region of a fuel bundle, especially in the cold shut down state of the reactor. A fuel bundle was disclosed in which clustered part length fuel rods defined a large, central, generally conical shaped void in the upper two phase region of the fuel bundle.

Two embodiments were disclosed in the Ueda reference. A first embodiment includes a large conical water rod occupying the large central conical void defined collectively by the part length rods. A second, and apparently preferred embodiment, disclosed the conical region otherwise unoccupied.

Regarding this latter design, testing has established that while nuclear improvements in the upper two phase region in the cold state might be realized, adverse heat transfer performance, especially in terms of adverse critical power may be realized by large central void regions in a boiling water reactor fuel bundle. Specifically, the large defined void results in vapor being concentrated to the region. Unfortunately, surrounding portions of the two phase region tends to flow into the steam vent area. This results in the diversion of significant amounts of liquid coolant away from the heated rod surfaces adjacent the void, this liquid coolant being entrained in the accelerated steam flow within the large defined conical void. There results a reduced flow adjacent the full length fuel rods which surround the large void. This reduced flow rate has a corresponding reduced critical power on the rod surfaces adjacent the void. Overall fuel bundle efficiency is reduced.

In Dix et al. U.S. Pat. No. 5,017,332 entitled Two-Phase Pressure Drop Reduction BWR Assembly Design, issued May 21, 1991 (formerly U.S. Pat. Application Ser. No. 07/176,975, filed Apr. 4, 1988), we maintained the nuclear benefits and removed the adverse thermal hydraulic effects by using generally smaller open flow channels dispersed across the two phase region of the fuel bundle lattice. The dispersed flow channels realized the natural tendency of the vapor phase of the two phase mixture to migrate ("drift") toward the low resistance flow paths where the realized flow was primarily vapor. It has been found that such dispersed flow paths are favorable for a BWR fuel assembly since preferential diversion of vapor away from the fueled rods has combined nuclear, stability, and thermal hydraulic advantages.

SUMMARY OF THE INVENTION

In a fuel bundle for a boiling water reactor having one or more part length rods in the two phase region, one or more steam vent tubes are introduced overlying the part length rods. The fuel bundle includes a lower tie plate for admitting water moderator and supporting a plurality of fuel rods in upstanding side-by-side relation, an upper tie plate for permitting water and steam to be discharged from the top of the fuel bundle and maintaining the fuel rods in upstanding side-by-side relation, a surrounding fuel channel for confining moderator flow along a path over the fuel rods and between the tie plates, and dispersed vertically intermittent spacers for maintaining the fuel rods in their designed side by side relation. One or more fuel rods extends from the lower tie plate vertically less than the full length to the upper tie plate ending interior of the fuel bundle at a disposition where the upper end of the part length rods is braced in the vertical position by a spacer. At least one of these partial length rods is provided with an overlying steam vent tube. This steam vent tube has openings and devices distributed along its length to encourage steam flow interior of the tube and remove liquid flow from the interior of the tube. The vent tube wall eliminates the interface drag between the steam interior of the tube and the surrounding water steam mixture. The presence of the steam vent tube as a high velocity steam escape path enables remaining portions of the fuel bundle to contain a higher liquid moderator fraction with flatter axial voids and power distributions during the operating state of the fuel bundle. The presence of high velocity escaping steam combined with distributed apertures along the length of the steam vent tube promotes resistance to fluid oscillations within the fuel bundles. Variations of steam vent tubes are disclosed including steam vent tubes overlying multiple clustered part length rods. There results a fuel bundle design in which the entire upper cross section of the fuel bundle is devoted to steam generation and coolant outflow as contrasted to a fuel bundle having conventional water rods.

OTHER OBJECTS, FEATURES AND ADVANTAGES

An object of this invention is to disclose the use of at least one steam vent tube overlying at least one part length fuel rod within a fuel bundle of a boiling water nuclear reactor. According to this aspect, the part length rod—resting on the lower tie plate and terminating before reaching the upper tie plate—is provided with an overlying tube. This tube opens overlying the end of the part length rod and extends from the vicinity of the end of the part length fuel rod at least part way the distance between the end of the fuel rod and the upper tie plate. Typically, the tube is open overlying the part length rods and open at its point of discharge to and through the upper tie plate. Because of the opening of the tube overlying the end of the part length rod, the steam vent tube preferentially admits initial vapor flow to the interior of the tube and thereafter rapidly vents the vapor to discharge at the upper tie plate.

An advantage of the steam vent tube is that it forms a dividing wall flow interface between rapidly flowing, upwardly venting steam interior of the tube and the surrounding two phase steam water mixture exterior of the steam vent tube. There results an isolated steam flow channel having a reduction in flow friction and a local increase in the volumetric flux of vapor outflow. The turbulent interface between the upwardly flowing steam and the surrounding two phase mixture is removed. Consequently, entrainment between the upwardly flow vapor and the bounding two phase liquid vapor region is removed.

A further advantage of the steam vent tube is that it establishes a localized high velocity steam vent within the interior upper two phase region of the fuel bundle. As a result, less of the upper cross sectional area of the fuel bundle within the two phase region is required for upward vapor flow. The upper volume of the fuel bundle not occupied by vapor flow can instead be occupied by two phase liquid vapor mixture having a higher water content. There results a fuel bundle capable of maintaining a higher overall liquid moderator content. Flatter axial voids and power distributions result.

Yet an additional advantage of the steam vent tube is that the entire upper portion of the fuel bundle is utilized either for the generation of steam or out flow of liquid and vapor moderator. Large flow blocking water rods for increasing the fuel to moderator ratio—but also otherwise obstructing flow area—are not required. A fuel bundle concept is disclosed in which the steam vent tube in classifying water to the exterior of the vent tube functions to both provide improved moderator fraction while maintaining (and not obstructing) flow area.

An additional advantage of the disclosed concept is that it provides additional moderator in a manner which is the inverse of moderator provided by the more typically used large water rods. By the expedient of providing a concentrated isolated flow path for the upward preferential flow of vapor, the remain portions of the fuel bundle in the upper two phase region can have increase liquid moderator content—equivalent in may cases to that moderator content supplied by a large water rod. At the same time, all areas of the upper two phase region of the bundle are available for moderator flow. As a result, no portion in the fuel bundle need be dedicated to flow obstructing water rods.

An additional object of this invention is to disclose a series of openings along the length of the steam vent tubes, these opening designed to preferentially admit vapor interior of the tubes and to preferentially exclude liquid interior of the tube. According to this aspect of the invention, the steam vent tube has at least one—and is preferably manifolded—with openings along its length. These openings are designed with vapor liquid separation configurations for preferentially admitting vapor interior of the steam vent tube and preferentially excluding liquid interior of the steam vent tube.

An advantage of the manifolding of the steam vent tube is that a natural resistance to hydraulic oscillations is present in the arrangement. Lower frequency natural resonant oscillations within the surrounding two phase region of the fuel bundle are not in phase with higher frequency natural resonant oscillations within the steam vent tube. The result is that the two different resonant frequency systems tend to dampen one another. The tendency of the fuel bundle to resonate at one frequency is reduced.

Other objects, features and advantages of this invention will become more apparent after referring to the following drawings in which:

FIG. 1 is a perspective view of a nuclear fuel bundle for a boiling water reactor, the bundle being shown in section in the upper two phase region of the bundle adjacent the upper tie plate and illustrating four steam vent tubes, each overlying a part length rod, with the two part length rods and steam vent tubes in the foreground being exposed by breaking away the channel and tubes that would otherwise obstruct view;

FIG. 2 is a perspective view of one of the partial length rods of FIG. 1 illustrating the bottom rod opening, the upper discharge adjacent the tie plate, and the wall openings extending between the bottom opening and top discharge for the preferential admittance of steam interior of the vent tube and the preferential ejection of water from the interior of the vent tube the rods and steam vent tube being broken away to less than their full vertical height;

IN THE SPECIFICATIONS

Figure 1:
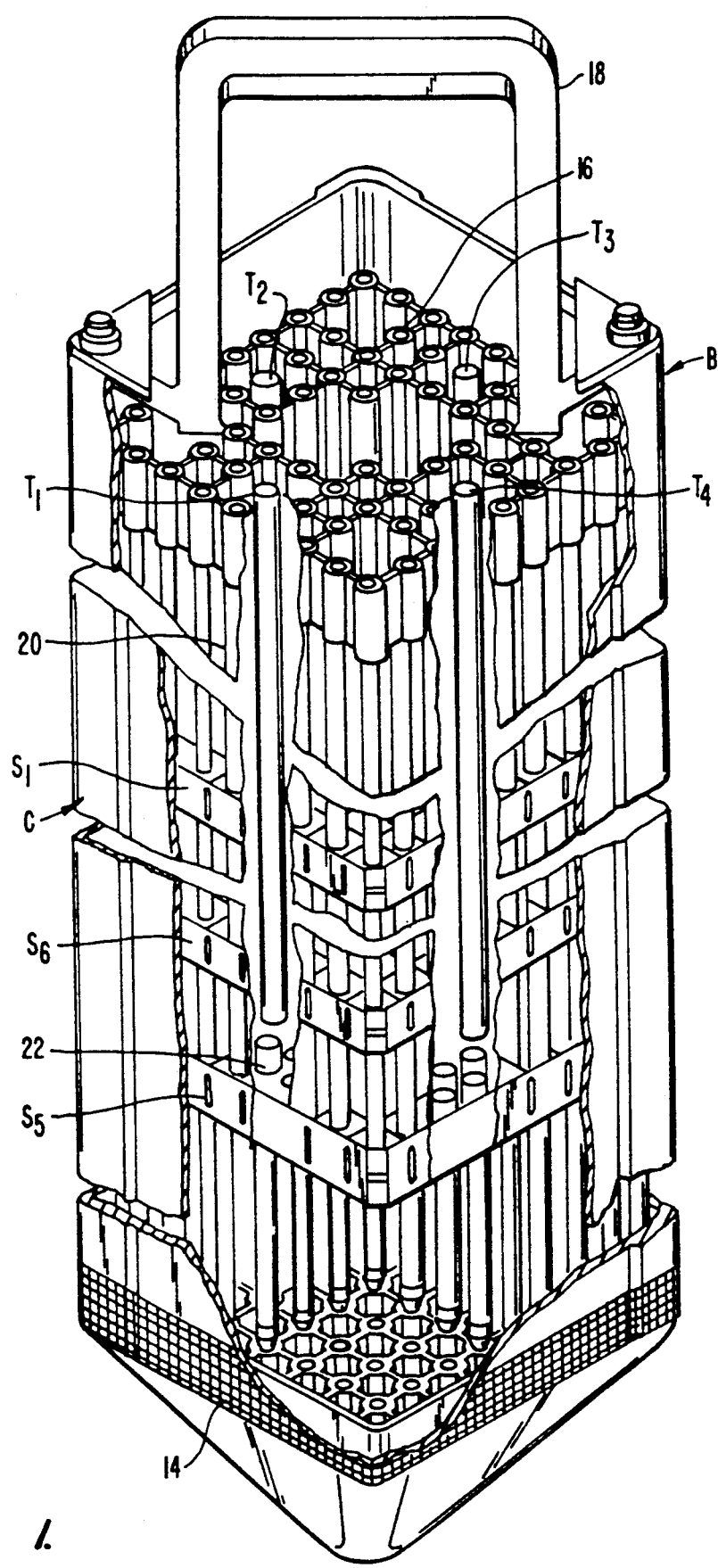

Referring to FIG. 1, a fuel bundle B utilizing this invention is illustrated. The fuel bundle is, for the most part, conventional.

The reader will note that the preferred embodiment of the invention as set forth in FIG. 1 does not include water rods. As will hereinafter more fully be developed, the presence of the steam vent tubes of this invention may well obviate the need for such water rods.

The fuel bundle here illustrated includes full length fuel rods 20 and part length fuel rods 22. Full length fuel rods 20 are conventional and extend the full distance between lower tie plate 14 to upper tie plate 16. The reader will understand that the channel C has been broken away so that the fuel rods are exposed.

Part length rods 22 are also present. These part length rods extend from lower tie plate 14 and terminate short of upper tie plate 16.

Spacers are also utilized. Typically, as here shown, seven such spacers are evenly placed throughout the fuel bundle. Part length rods 22 are here shown terminating just above spacer 5. Thereafter, at spacer 6 and 7, a steam vent volume is defined overlying the end of the part length rods. It is into this steam vent volumes that the steam vent tubes T1–T4 of this invention are placed.

The reader will understand that the length of fuel rod used here is exemplary; lengths of fuel rods other than those specifically shown may be used.

Figure 2:
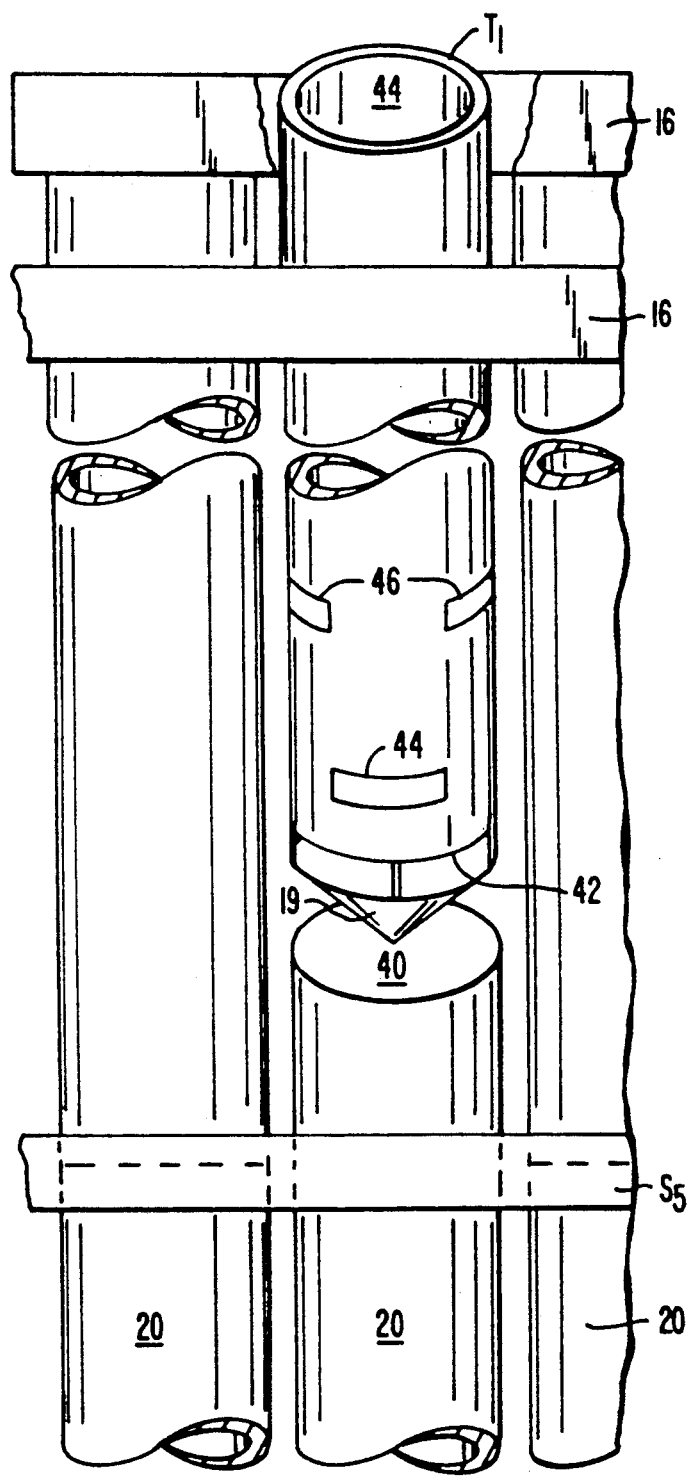

Referring to FIG. 2, this type of steam vent tubes placed within the fuel bundle B of FIG. 1 are illustrated. Specifically, paired full length rods 20 are shown sectioned from an interior portion of the bundle extending upwardly on either side of a part length rod 22. Part length rod 22 terminates at spacer S5 just above the spacer at end 40. Overlying, or connected to end 40 of the part length rod is steam vent tube T1 having a deflector 19 which is here shown conical in shape. Deflector 19 is separated a small interval from steam vent tube T1 for the purpose of deflecting water off the end of the rod and permitting the preferential entry of steam into vent tube T1.

Tube T1 includes a lower opening 42 for receiving steam off the end of part length rod 22 at end 40. The tube extends upwardly and through the upper tie plate 16 at a discharge end 44 for venting steam through the upper tie plate. Suspension of the steam vent tube occurs from upper tie plate 16 and spacers S6 and S7 (see FIG. 1). Optimally, and adjacent the end 40 of partial length rod 22 in the steam vent tube, there can be provided openings 44, 46. These openings can have functions for either ejecting water from the interior of the steam vent tube T1, or for admitting steam. The function of these openings will hereinafter be described with respect to FIGS. 7 and 8.

Figure 3:
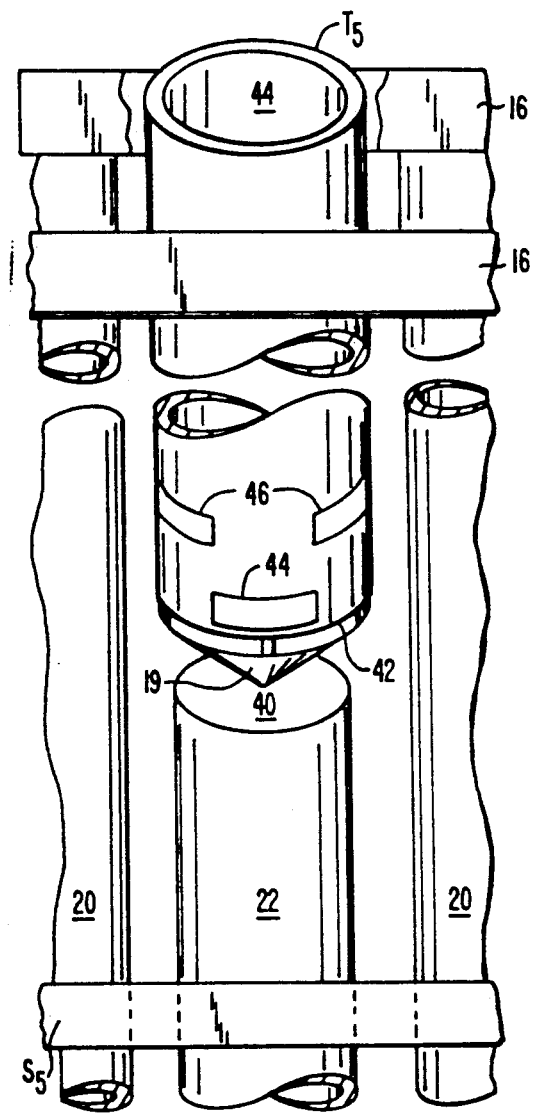
FIG. 3 is an alternate perspective view broken away similar to FIG. 2 of one of the partial length rods of FIG. 1 illustrating an embodiment where the steam vent tube overlying the part length rod has an increased diameter with respect to the underlying steam Vent tube.

Referring to FIG. 3, an alternate embodiment of the steam vent tubes is illustrated at T5. A partial length rod 22 is again shown between full length rods 20 terminating at end 40. Overlying the part length rod 22, there is provided a steam vent tube 25 and deflector 19.

Comparing this view with that shown in FIG. 2, it can be seen that the diameter of the tube T5 exceeds the diameter illustrated of both the rods 20, full length rods 20, and the part length rods 22. All other constructions remain, including lower opening 42, upper opening 44, and vents 44,46.

Figure 4:
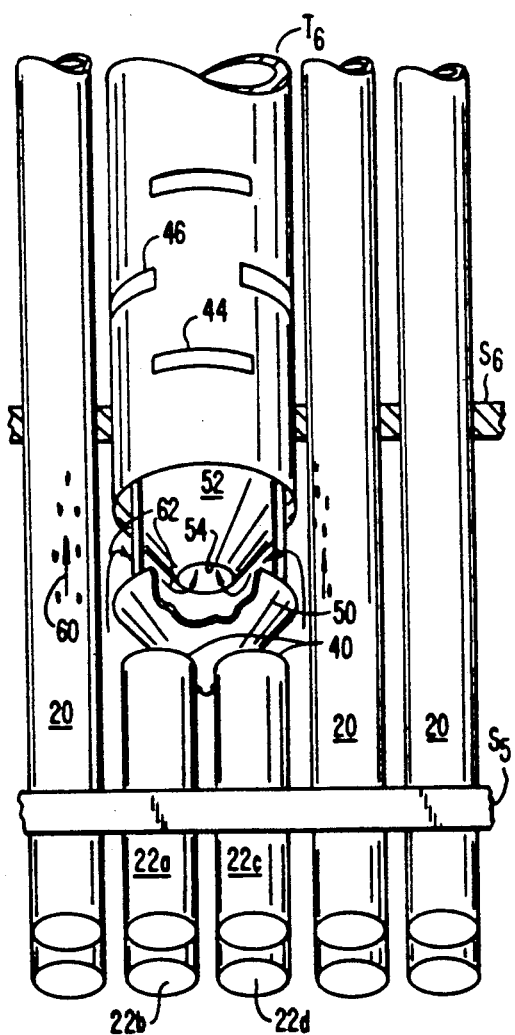
FIG. 4 is a perspective view of a fuel bundle having four part length rods placed in a side by side grouping with a flow diverter place immediately over the end of the part length rods with the opening of the overlying circular sectioned steam vent tube being provided with a circuitous entry path for the preferential admission of vapor and corresponding exclusion of water from entry into the tube.

Referring to FIG. 4, an additional steam vent tube T6 is illustrated. Tube T6 is shown at its lower end only between lower spacer S5 and upper spacer S6.

As can be seen in the view of FIG. 4, four part length rods 22A, 22B, 22C and 22D are placed inside in a side-by-side array. Rods all terminate at an upper end 40 which end 40 is clustered interior of the fuel bundle. Thus, the volume overlying the ends of the part length rods 40 and the upper tie plate constitutes an interval which would normally be occupied by four full length rods 20.

A steam trapping entry is provided by a first complete cone 50 and a second cone truncated at the apex, this second cone being designated 52.

Portions of the complete cone 50 are broken away to expose the truncated apex 54.

As before, apertures 44,46 interrupt and manifold the sidewalls of the steam vent tube T6.

An explanation of the entry of steam and the rejection of water at the respective cones 50,52 is instructive.

As is well known, in a two-phase liquid vapor mixture, the liquid occupies a higher density. Therefore, upon impact with lower cone 50, liquid will typically continue along the outside of the tube T6 (see the schematically illustrated liquid at vector 60).

The low density steam is another matter. Typically, the steam will find its way around and into the truncated apex 54 of truncated cone 52 (see schematic vectors 62). Stated in ordinary terms, the steam has a density which will admit of its following circuitous flow paths. Once the steam is interior of the steam vent tube T6, upward flow will continue.

Figure 5:
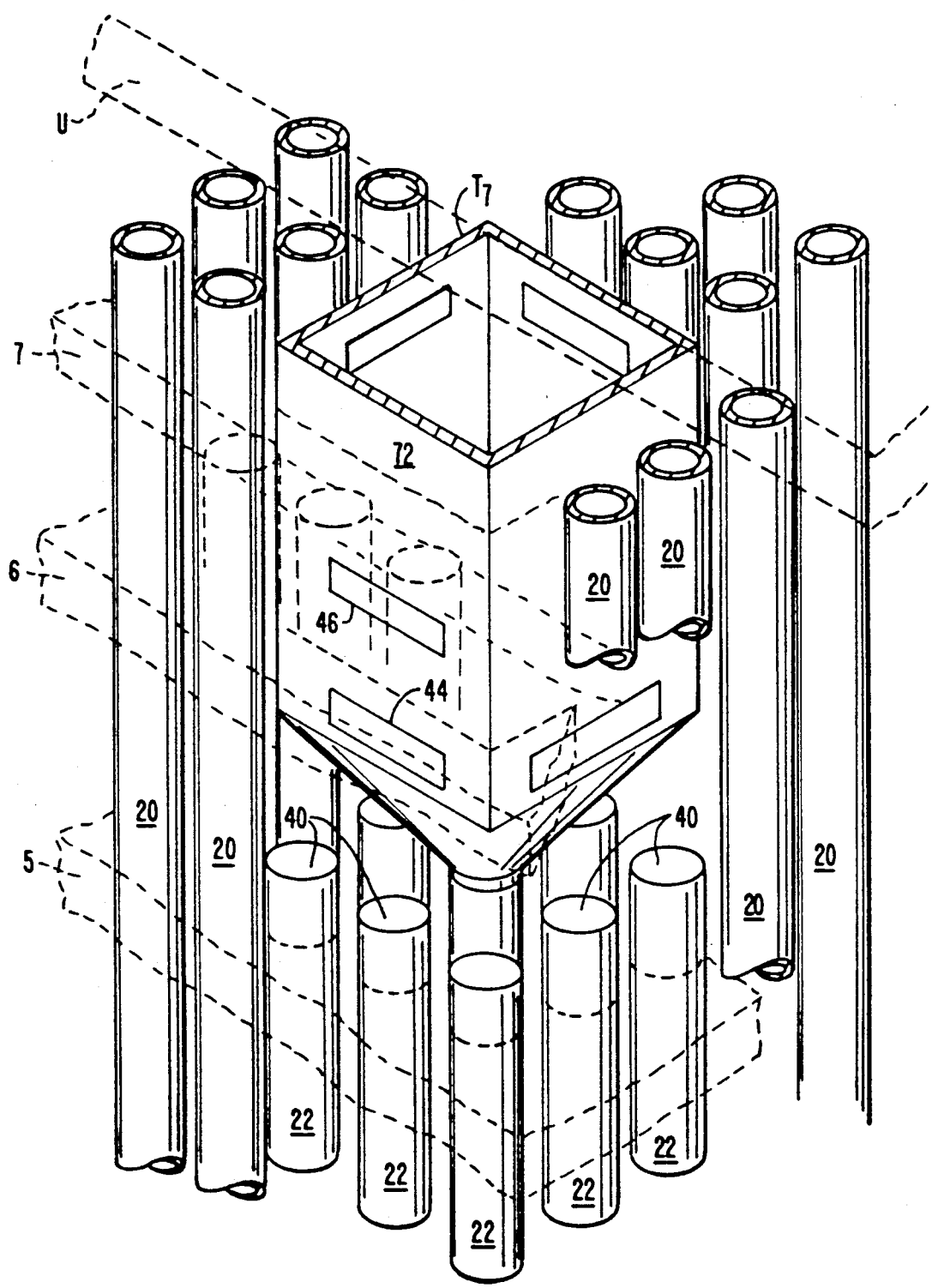
FIG. 5 is a perspective view of an alternate embodiment of the steam vent tube, the tube being enlarged to overly a group of nine part length rods, the tube here being of a square cross section for the full occupation of the lattice spaces overlying the part length rods.

Thus far, all steam vent tubes illustrated have been of circular section. Referring to FIG. 5, a square section T7 steam vent tube is illustrated. Referring to FIG. 5, a plurality of full length rods 20 surrounds a cluster of nine partial length rods 22. Partial length rods 22 all terminate at upper ends 40. Since the rods 22 are in a 3×3 array, it will be understood that overlying the ends 40 of the part length rods there exists a steam vent volume that may be suitably occupied by a square sectioned steam vent tube T7.

Steam vent tube T7 has a generally conical bottom 70 flaring to a square sectioned tube structure 72. As before, tube structure 72 continues upwardly through the upper tie plate, it being realized that the top portion of the tube T7 is not illustrated. As before, apertures 44,46 are present.

Figure 6A:
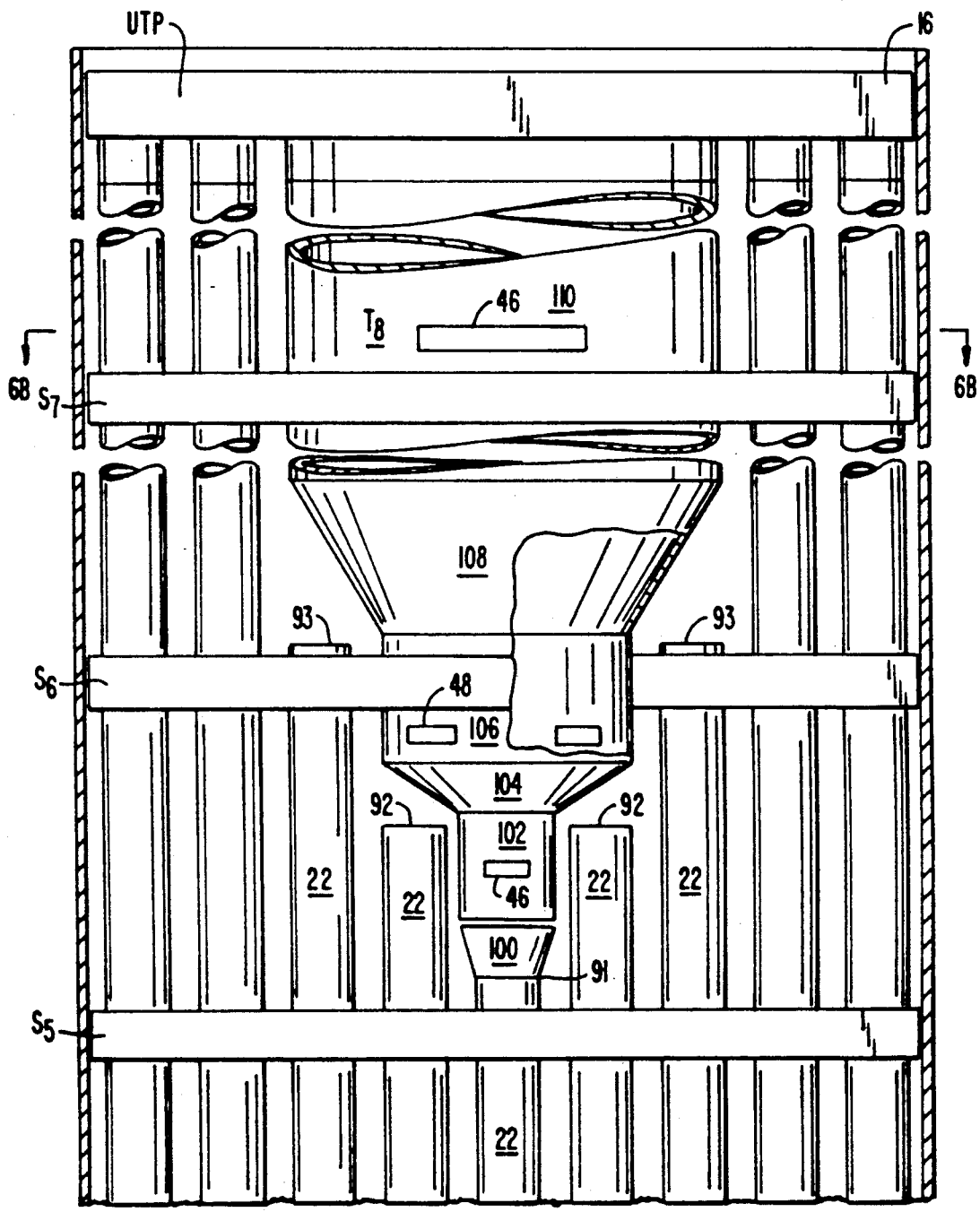
FIGS. 6A and 6B are side elevation sectional views and a plan view respective of an alternative system arrangement of the steam vent tube of this invention with a single large central steam vent tube occupying a large central conical vacancy created by a plurality of part length rods of differing lengths, the steam vent tube here illustrated being circular in section.

Referring to FIG. 6A, a steam vent tube placed within a generally conical void within a fuel bundle is shown. A plan view of the steam vent tube T8 is illustrated in FIG. 6B.

Figure 6B:
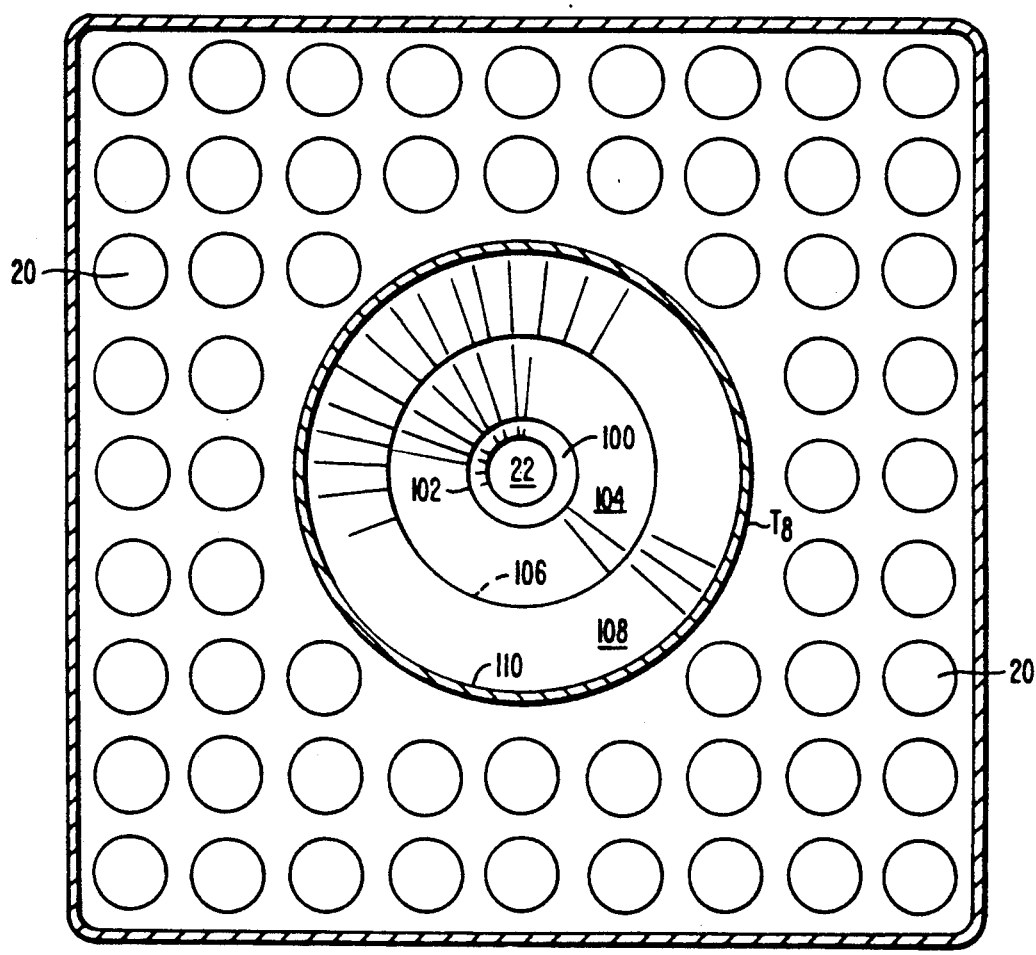

Referring to FIG. 6B, a 9×9 array of full length rods is illustrated. This 9×9 array has 21 part length rods 22 terminating underlying the steam vent tube T8. Referring to FIG. 6A, it can be seen that the central length rod 22 terminates at a first elevation 91. Second part length rods 22 terminate at second elevations 92. Finally, third groups of path length rods 22 terminate at third elevations 93. The rods are placed in a stepped configuration similar to that illustrated in Ueda, Japanese Patent Showa 52-50489 so as to define from lower spacer S5 to upper tie plate 16, a generally conical volume.

This volume is filled with a step tapered tube T8. Tube T8 includes a flare portion 100 at the upper end of short partial length rod 22. Thereafter, a cylinder 102 connected by truncated cone 104, connects to cylinder 106. A second truncated cone 108 connects to cylinder 110. Cylinder 110 extends upwardly to and possibly through tie plate 16. As before, alternating openings 46,48 are shown utilized.

Figure 7:
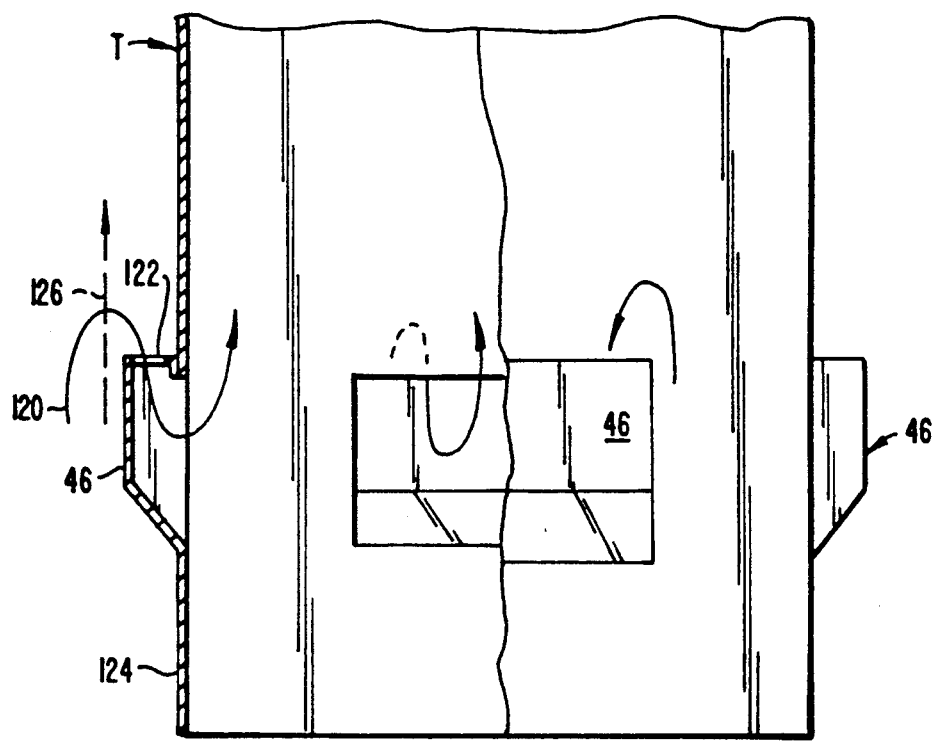
FIG. 7 is a steam vent tube illustrating lower peripheral passages for permitting the preferential influx of steam; and, FIG. 8 is a steam vent tube illustrating upper peripheral passages for permitting the preferential ejection of water from the interior of the steam vent tube.

Referring to FIG. 7, a vent 46 is illustrated which vent 46 in the side of a vent tube T permits the preferential entry of vapor along an illustrated path 120. Aperture 46 includes an upper opening 122 and is disposed outwardly from the linear wall 124. As can be seen, vapor with its low density can follow the circuitous path 120. Water with its higher density will pass by aperture 122 as illustrated in vector 126. It will be realized that the aperture shown in FIG. 7 is shown in a planar wall. This aperture can just as easily be adapted to circular walls.

Figure 8:
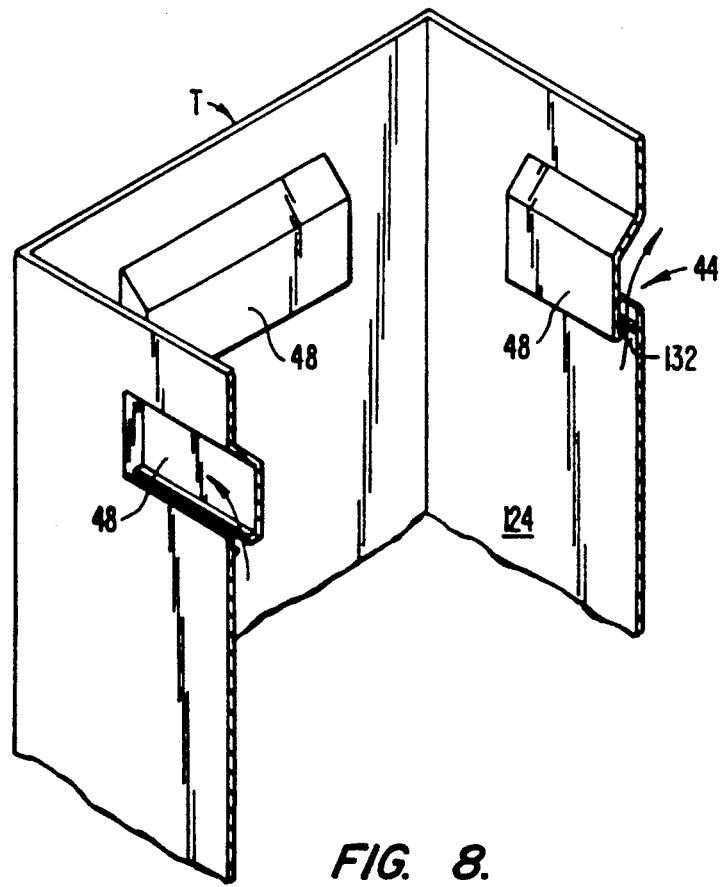

Referring to FIG. 8, a vent 48 is illustrated which vent 48 is for the ejection of water interior of the wall 124. Specifically, water will normally flow against the wall. Since aperture 132 of opening 48 is downwardly disposed, water tracking along wall 124 will be ejected from the interior of the steam vent tube T. It will be realized that the placement of the respective apertures 46,48 and their respective dimensions will be a function of the size of the steam vent tube, the total volume of vapor to flow within the tube as well as the total volume of water to be ejected from the tube. Thus, the designer will place these apertures and dimension them in accordance with the design parameters of the fuel bundle involved.

It will be realized that I have shown my preferred embodiment without a water rod. Those having skill in the art will understand that a water rod can be added.

Further, I have shown the steam vent tubes of my invention fastened to the spacers and tie plates. The steam vent tube can as well be fastened to the end of the part length rod.

What is claimed is:

1. In a fuel bundle for a boiling water reactor having: a plurality of vertically aligned spaced apart fuel rods for forming a fuel rod group within said fuel bundle for generation of a fission reaction in the presence of water moderator, a lower tie plate for admitting water moderator through said lower tie plate to the interstitial volume between said fuel rods and supporting said vertically aligned and spaced apart fuel rods, an upper tie plate for permitting water and steam to be discharged from the top of the fuel bundle and maintaining said vertically aligned and spaced apart fuel rods in upstanding spaced apart side-by-side relation, a surrounding fuel channel for confining moderator flow along a path over the fuel rods and from said lower tie plate to said upper tie plate; at least one of said fuel rods being a part length rod extending from the lower tie plate vertically less than the full length to the upper tie plate ending interior of the fuel bundle at a disposition wherein the upper end of the part length rods defines with respect to said surrounding fuel rods an empty volume overlying said partial length rod under said upper tie plate, the improvement to said fuel bundle comprising:
   at least one steam vent tube overlying at least one of said part length rods;
   means supporting said steam vent tube in said volume overlying said part length rod, said steam vent tube being supported in the volume of said fuel bundle between the end of said part length rod and said upper tie plate;
   said steam vent tube defining an opening disposed to said end of said part length rod for the receipt of steam moderator within said void overlying said part length rod;
   said steam vent tube further defining an opening disposed to said upper tie plate and away from the end of said part length rod for the discharge of steam moderator from said fuel bundle.

2. The invention of claim 1 and wherein said fuel bundle has a plurality of part length rods.

3. The invention of claim 2 and wherein said fuel bundle has said plurality of part length rods spaced apart one from another.

4. The invention of claim 1 and wherein said steam vent tube overlies a plurality of part length rods.

5. The invention of claim 1 and wherein said steam vent tube includes a plurality of apertures in the side walls of said steam vent tube for permitting fluid communication through the side walls of said steam vent tube.

6. The invention of claim 5 and wherein said apertures are configured to preferentially admit steam interior of said steam vent tube.

7. The invention of claim 5 and wherein said apertures are configured to preferentially discharge water from the interior of said steam vent tube.

8. The invention of claim 1 and wherein said steam vent tube overlying said part length rod is square.

9. The invention of claim 1 and wherein said steam vent tube overlying said part length rod is round.

10. The invention of claim 1 and wherein said steam vent tube includes means for classifying water flowing in the interior of said steam vent tube to the exterior of said steam vent tube.

11. A fuel bundle for boiling water reactor comprising:
    a plurality of vertically aligned spaced apart fuel rods for forming a fuel rod group within said fuel bundle for generation of a fission reaction in the presence of water moderator;
    a lower tie plate for admitting water moderator through said lower tie plate to the interstitial volume between said fuel rods and supporting said vertically aligned and spaced apart fuel rods;
    an upper tie plate for permitting water and steam to be discharged from the top of the fuel bundle and maintaining said vertically aligned and spaced apart fuel rods in upstanding spaced apart side-by-side relation;
    a surrounding fuel channel for confining moderator flow along a path over the fuel rods and from said lower tie plate to said upper tie plate;
    at least one of said fuel rods being a part length rod extending from the lower tie plate vertically less than the full length to the upper tie plate ending interior of the fuel bundle at a disposition wherein the upper end of the part length rods defines with respect to said surrounding fuel rods an empty volume overlying said partial length rod under said upper tie plate;
    at least one steam vent tube overlying at least one of said part length rods;
    means supporting said steam vent tube in said volume overlying said part length rod, said steam vent tube being supported in the volume of said fuel bundle between the end of said part length rod and said upper tie plate;
    said steam vent tube defining an opening disposed to said end of said part length rod for the receipt of steam moderator within said void overlying said part length rod;
    said steam vent tube further defining an opening disposed to said upper tie plate and away from the end of said part length rod for the discharge of steam moderator from said fuel bundle.

12. The invention of claim 11 and wherein said fuel bundle has a plurality of part length rods.

13. The invention of claim 12 and wherein said fuel bundle has said plurality of part length rods spaced apart one from another.

14. The invention of claim 1 and wherein said steam vent tube overlies a plurality of part length rods.

15. The invention of claim 11 and wherein said steam vent tube includes a plurality of apertures in the side walls of said steam vent tube for permitting fluid communication through the side walls of said steam vent tube.

16. The invention of claim 15 and wherein said apertures are configured to preferentially admit steam interior of said steam vent tube.

17. The invention of claim 15 and wherein said apertures are configured to preferentially discharge water from the interior of said steam vent tube.

18. The invention of claim 11 and wherein said steam vent tube overlying said part length rod is square.

19. The invention of claim 11 and wherein said steam vent tube overlying said part length rod is round.

20. The invention of claim 11 and wherein said steam vent tube include means for classifying water flowing in the interior of said steam vent tube to the exterior of said steam vent tube.

21. A process for improving the outflow of generated steam in a fuel bundle for a boiling water reactor including the steps of:

providing a plurality of vertically aligned spaced apart fuel rods for forming a fuel rod group within said fuel bundle for generation of a fission reaction in the presence of water moderator;

providing a lower tie plate for admitting water moderator through said lower tie plate to the interstitial volume between said fuel rods and supporting said vertically aligned and spaced apart fuel rods;

providing an upper tie plate for permitting water and steam to be discharged from the top of the fuel bundle and maintaining said vertically aligned and spaced apart fuel rods in upstanding spaced apart side-by-side relation;

providing a surrounding fuel channel for confining moderator flow along a path over the fuel rods and from said lower tie plate to said upper tie plate;

providing at least one of said fuel rods extending from the lower tie plate vertically less than the full length to the upper tie plate ending interior of the fuel bundle at a disposition wherein the upper end of the part length rods defines with respect to said surrounding fuel rods an empty volume overlying said partial length rod under said upper tie plate;

providing at least one steam vent tube overlying at least one of said part length rods;

supporting said steam vent tube in said volume overlying said part length rod, said steam vent tube being supported in the volume of said fuel bundle between the end of said part length rod and said upper tie plate;

defining an opening in said steam vent tube disposed to said end of said part length rod for the receipt of steam moderator within said void overlying said part length rod;

defining an opening in said steam vent tube disposed to said tie plate for the discharge of steam moderator from said fuel bundle; and, reacting said fuel bundle in the presence of water moderator to form in the upper tow phase region of said fuel bundle adjacent said part length rod a two phase mixture of steam and liquid moderation whereby steam finds a preferential flow path in said steam vent tube form the top of said part length rod to said upper tie plate.

* * * * *